(12) United States Patent
Su et al.

(10) Patent No.: US 9,189,106 B2
(45) Date of Patent: *Nov. 17, 2015

(54) OPTICAL TOUCH PANEL SYSTEM AND POSITIONING METHOD THEREOF

(75) Inventors: Tzung-Min Su, Hsin-Chu (TW); Chih-Hsin Lin, Hsin-Chu (TW); Ming-Tsan Kao, Hsin-Chu (TW)

(73) Assignee: PIXART IMAGING INCORPORATION, R.O.C., Hsin-Chu (TW)

( * ) Notice: Subject to any disclaimer, the term of this patent is extended or adjusted under 35 U.S.C. 154(b) by 119 days.

This patent is subject to a terminal disclaimer.

(21) Appl. No.: 13/525,213

(22) Filed: Jun. 15, 2012

(65) Prior Publication Data

US 2013/0147763 A1 Jun. 13, 2013

(30) Foreign Application Priority Data

Sep. 7, 2011 (TW) .............................. 100132233 A (51) Int. Cl.
*G06F 3/042* (2006.01)
*G06F 3/041* (2006.01)

(52) U.S. Cl.
CPC ............ *G06F 3/0425* (2013.01); *G06F 3/0418* (2013.01); *G06F 3/0421* (2013.01)

(58) Field of Classification Search
CPC ..... G06F 3/042; G06F 3/0421; G06F 3/0423; G06F 3/0425; G06F 3/0418

USPC .......................... 345/173–178; 362/600–634
See application file for complete search history.

(56) References Cited

U.S. PATENT DOCUMENTS

| | | | |
|---|---|---|---|
| 4,782,328 A * | 11/1988 | Denlinger | 341/5 |
| 7,274,356 B2 | 9/2007 | Ung et al. | |
| 7,689,381 B2 | 3/2010 | Lin et al. | |
| 2009/0243824 A1* | 10/2009 | Peterson et al. | 340/435 |
| 2010/0010773 A1* | 1/2010 | Lin et al. | 702/152 |
| 2010/0309169 A1* | 12/2010 | Lieberman et al. | 345/175 |
| 2011/0061950 A1* | 3/2011 | Cheng et al. | 178/18.09 |
| 2011/0115904 A1* | 5/2011 | Te-Yuan et al. | 348/135 |
| 2011/0128255 A1* | 6/2011 | Feng et al. | 345/175 |

* cited by examiner

*Primary Examiner* — Charles Hicks
*Assistant Examiner* — Brent D Castiaux
(74) *Attorney, Agent, or Firm* — Tung & Associates (57) ABSTRACT

An optical touch panel system includes: a reflective element disposed on a first side of the touch control area; two lighting elements respectively disposed on a second side and a third side of the touch control area, wherein the second side and the third side are adjacent to each other, and the third side is opposite the first side; a first light projection apparatus including a mirror and a light generator, disposed on the first side and at a location adjacent to a fourth side of the touch control area; an image sensor capturing a first picture and a second picture respectively when the light generator is inactivated and activated; and a processor calculating a coordinate of the object according to geometrical information of an projected object image and a projected mirror image of the object in the first picture and the second picture.

24 Claims, 9 Drawing Sheets

OPTICAL TOUCH PANEL SYSTEM AND POSITIONING METHOD THEREOF

CROSS REFERENCE

The present invention claims priority to TW 100132233, filed on Sep. 7, 2011.

BACKGROUND OF THE INVENTION

1. Field of Invention

The present invention relates to an optical touch panel system and a positioning method thereof, in particular to such optical touch panel system and positioning method which utilize a light projection apparatus capable of selectively emitting light or reflecting external light to resolve the problem of blind zones.

2. Description of Related Art

Touch screen is an interactive apparatus for users to directly and intuitively operate application software on the screen. There are various types of touch screens, one of which is the optical touch panel.

Figure 1:
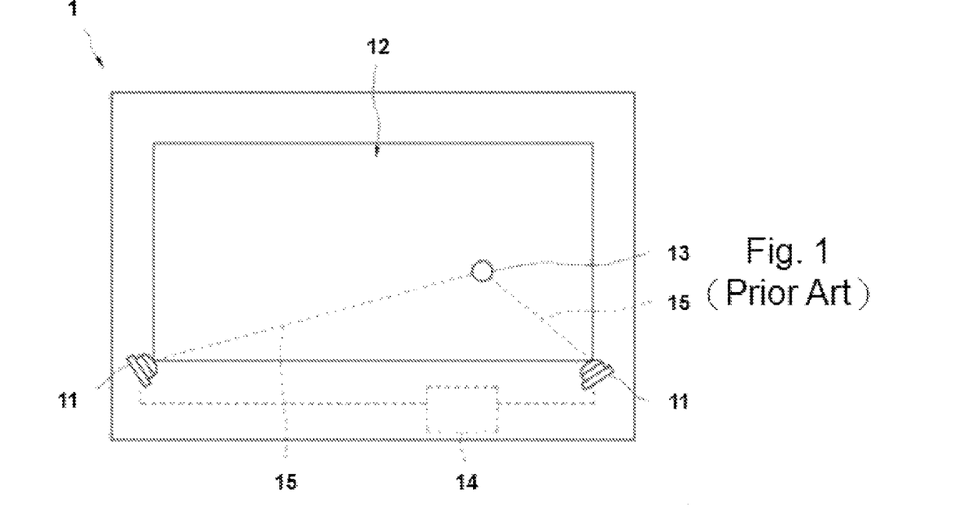
FIG. 1 shows a prior art optical touch panel system.

FIG. 1 shows a prior art optical touch panel system 1, which is disclosed by U.S. Pat. No. 4,782,328. As shown in FIG. 1, the optical touch panel system 1 comprises two sensors 11 for capturing images of an object 13 on a touch control area 12. A processor 14 is coupled to the two sensors 11; it analyzes the images generated by the sensors 11 to determine the sensing paths 15 linking the object 13 to the two sensors 11. The processor 14 calculates the coordinate of the object 13 according to the sensing paths 15.

Figure 2:
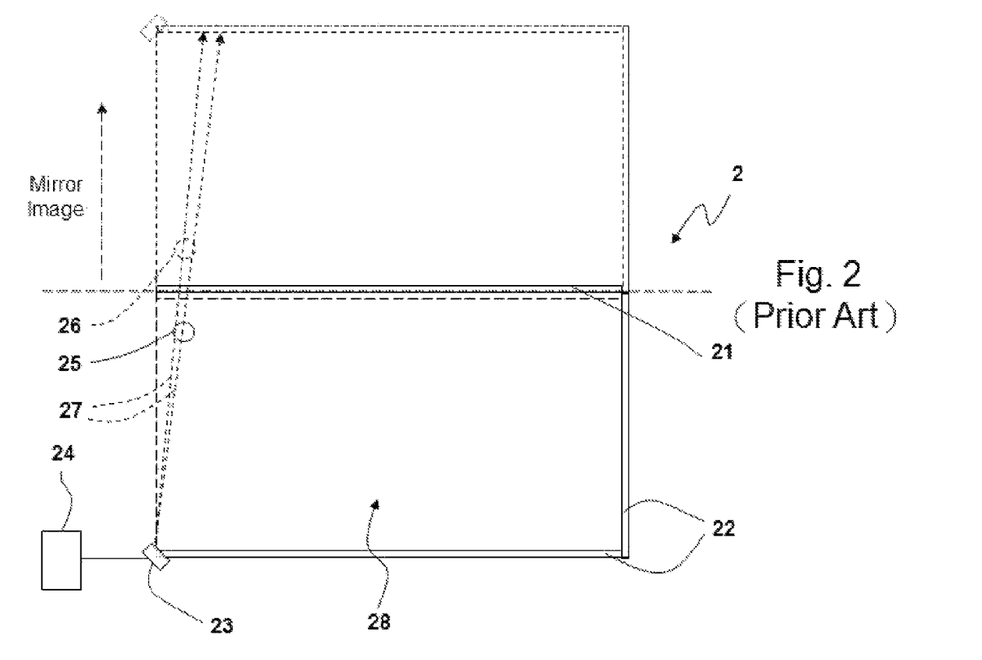
FIG. 2 shows another prior art optical touch panel system.

FIG. 2 shows another prior art optical touch panel system 2 which is disclosed by Taiwanese Patent Publication No. 201003477 (counterpart U.S. Pat. No. 7,689,381 B2). The optical touch panel system 2 comprises a mirror 21, two light sources 22, an image sensor 23 and a processor 24. The mirror 21 and the two light sources 22 are located at the periphery of a touch control area 28. The mirror 21 reflects the object 25 to generate a mirror image 26. The image sensor 23 captures the real image of the object 25 and the mirror image 26. The processor 24 analyzes the sensing paths 27 passing the real image of the object 25 and the mirror image 26, and calculates the coordinate of the object 25 according to the two sensing paths 27.

In the optical touch panel system 2, when the two sensing paths 27 are too close to each other, the real image of the object 25 and the mirror image 26 overlap with each other, and the position of the object 25 cannot be obtained. As shown in FIG. 2, when the object 25 is in the region of the touch control area 28 near the side where no light source is provided, the precise position of the object cannot be detected because the real image of the object and the mirror image will overlap. This region is called the blind zone.

Figure 3:
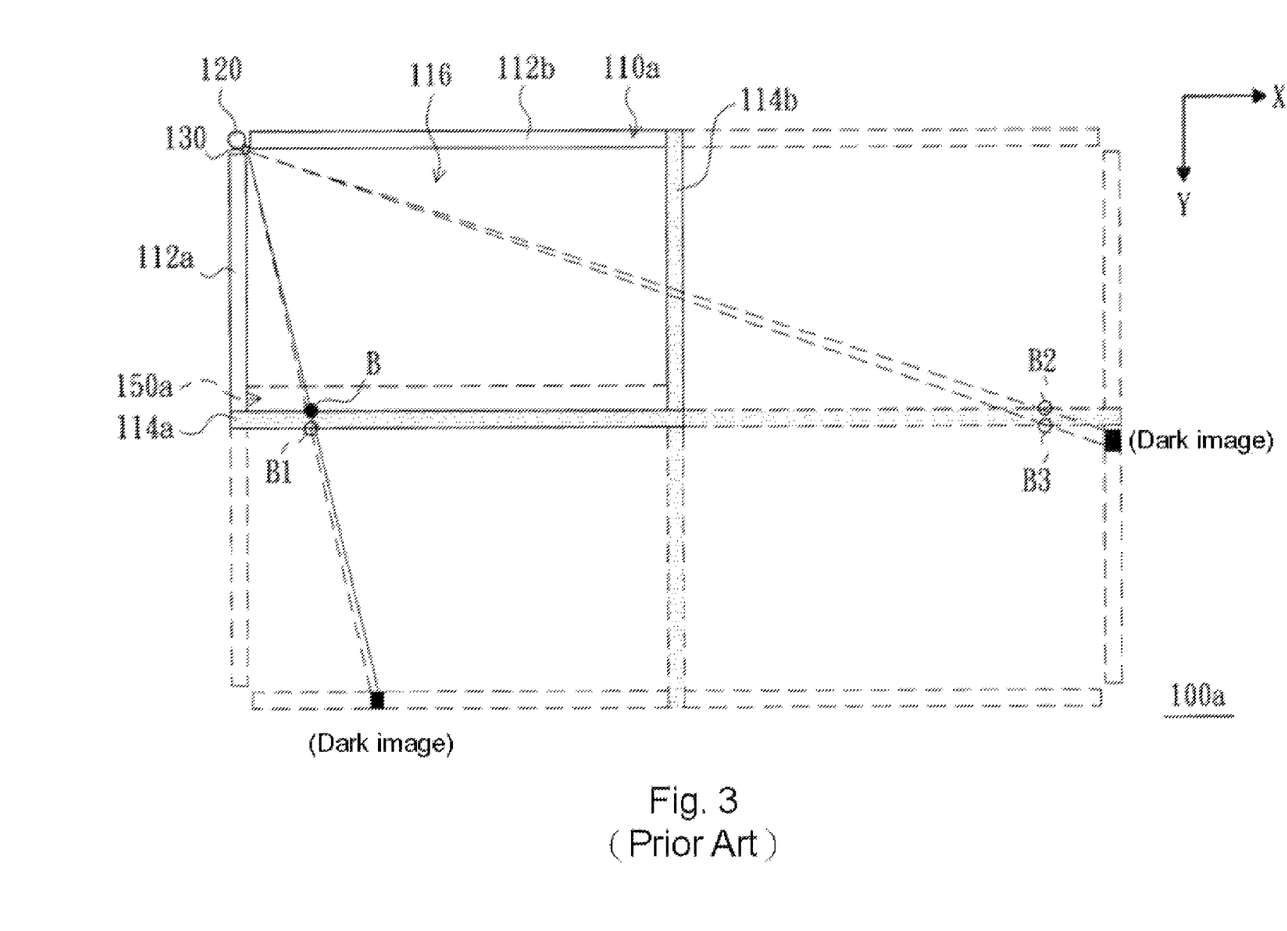
FIG. 3 shows another prior art optical touch panel system.

Taiwanese Invention Patent Application No. 098131423 (FIG. 10 of U.S. Patent Publication No. 2010/0309169 also discloses a similar apparatus) provides an optical touch control apparatus, as shown in FIG. 3. The optical touch control apparatus 100a comprises a lighting device 120, an image detection module 130, two light guide bars (112a, 112b), and two stripe-like mirrors (114a, 114b). The light guide bars (112a, 112b) are close to each other, and the stripe-like mirrors (114a, 114b) are close to each other. The light guide bars (112a, 112b) and the stripe-like mirrors (114a, 114b) are disposed around the four sides of a rectangle. The inside area of the rectangle is a sensing area 116. The light guide module 110a includes two stripe-like mirrors (114a, 114b), so each point being touched in the sensing area 116 generates three mirror images. The image detection module 130 captures the real image of the object B and the mirror images B1-B3, and calculates the position of the object B according to these images. The area of the blind zone 150a in the optical touch control apparatus 100a is reduced, but the problem of the blind zone still exists. That is, the dark images of B and B1 partially overlap with each other and the dark images of B2 and B3 partially overlap with each other. In addition, infinite reflection occurs in the neighborhood of the corner between the two stripe-like mirrors (114a, 114b). For this reason, U.S. Pat. No. 7,274,356 B2 disposes anon-reflective region at this corner to resolve the problem.

SUMMARY OF THE INVENTION

An objective of the present invention is to provide an optical touch panel system.

Another objective of the present invention is to provide a positioning method of an optical touch panel system.

To achieve the foregoing objectives, in one aspect, the present invention provides an optical touch panel system for positioning an object in a touch control area, the system comprising: a reflective element disposed on a first side of the touch control area; two lighting elements respectively disposed on a second side and a third side of the touch control area, wherein the second side and the third side are adjacent to each other, and the third side is opposite the first side; a first light projection apparatus including a mirror and a light generator, disposed on the first side and at a location adjacent to a fourth side of the touch control area; an image sensor capturing a first picture and a second picture respectively when the light generator is inactivated and activated; and a processor calculating a coordinate of the object according to optical information of an object and a mirror image of the object in the first picture and the second picture, wherein the optical information of the object is a projected image of the object (projected object image) and the optical information of the mirror image is a projected image of the mirror image (projected mirror image).

In one embodiment of the optical touch panel system, the processor calculates the coordinate of the object according to geometrical information of the optical information, wherein the geometrical information includes centers, gravity centers, representative positions, or borders of the projected object image and the projected mirror image.

In one embodiment of the optical touch panel system, the first light projection apparatus is adjacent to the fourth side, and the image sensor is disposed at the corner between the third side and the fourth side.

In one embodiment of the optical touch panel system, the first picture is captured by the image sensor when the first light projection apparatus inactivates the light generator, and the first picture includes one overlapped imaging region in which the projected object image overlaps the projected mirror image, or two separate imaging regions one including the projected object image and the other including the projected mirror image; the second picture is captured by the image sensor when the first light projection apparatus activates the light generator, and the second picture includes an imaging region of the projected object image. The processor obtains the coordinate of the object according to the border of the overlapped imaging region of the first picture and the gravity center of the imaging region of the second picture, or according to the gravity centers of the two imaging regions of the first picture.

In one embodiment, the optical touch panel system further comprises a second light projection apparatus disposed on the second side and at a location adjacent to the third side, wherein the second light projection apparatus includes a mirror and a light generator.

In one embodiment of the foregoing optical touch panel system, the first picture is captured by the image sensor when the first light projection apparatus inactivates its light generator and the second light projection apparatus activates its light generator, wherein the first picture includes one overlapped imaging region in which the projected object image overlaps the projected mirror image, or two separate imaging regions one including the projected object image and the other including the projected mirror image; the second picture is captured by the image sensor when the first light projection apparatus activates its light generator and the second light projection apparatus inactivates its light generator, wherein the second picture includes two separate imaging regions of the projected object image and the projected mirror image. The processor obtains the coordinate of the object according to the gravity centers of the two imaging regions of the second picture when the first picture includes only one imaging region, or according to the gravity centers of the two imaging regions of the first picture when the first picture only includes two imaging regions.

In yet another aspect, the present invention provides a method of positioning an object in an optical touch panel system, the optical touch panel system including an image sensor for capturing a projected image of an object (projected object image) and a projected image of a mirror image of the object (projected mirror image), the method comprising: providing a first light projection apparatus capable of switching between a light emitting mode and a light reflecting mode; respectively capturing a first picture and a second picture by the image sensor when the first light projection apparatus is in the light emitting mode and the light reflecting mode, wherein the first picture and the second picture include imaging regions of the projected object image or the projected mirror image; if the number of the imaging region of the first picture is 1, obtaining the coordinate of the object according to geometrical information of imaging regions in the first picture and the second picture or according to geometrical information of imaging regions in the second picture; and if the number of the imaging regions of the first picture is 2, obtaining the coordinate of the object according to geometrical information of imaging regions in the first picture.

The objectives, technical details, features, and effects of the present invention will be better understood with regard to the detailed description of the embodiments below, with reference to the drawings.

DESCRIPTION OF THE PREFERRED EMBODIMENTS

Figure 4:
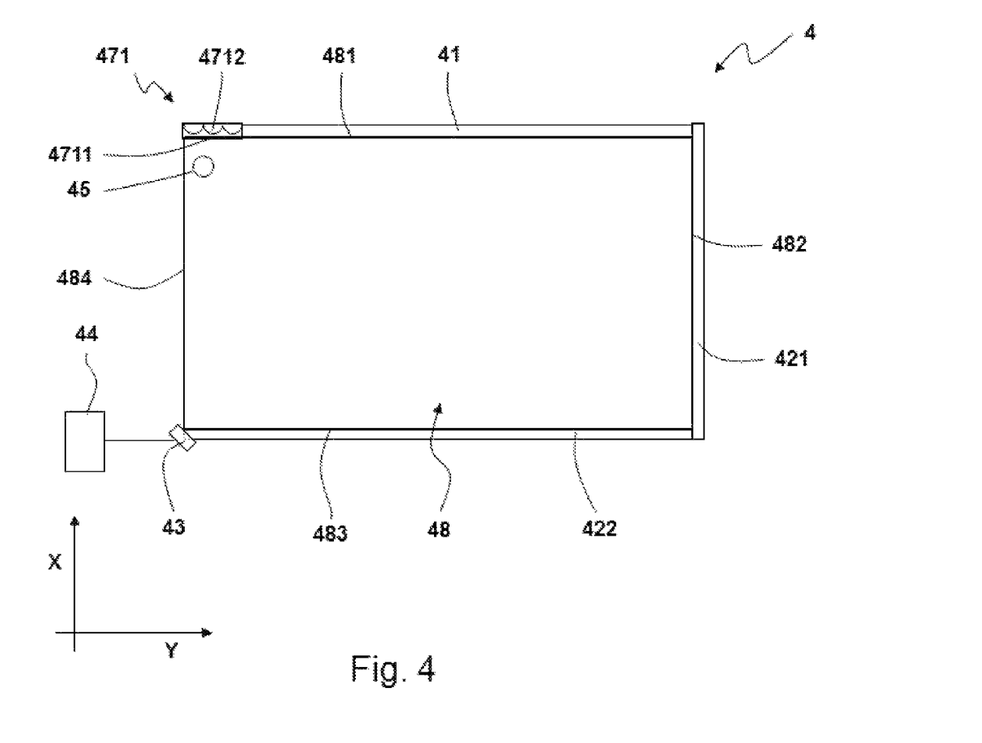
FIG. 4 shows a schematic diagram illustrating an embodiment of an optical touch panel system of the present invention.

FIG. 4 shows a schematic diagram illustrating an embodiment of an optical touch panel system of the present invention. When an object 45 (e.g. a finger or a stylus pen) touches the touch control area 48 of an optical touch panel system 4, the system is able to calculate the coordinate of the object 45, that is, to position it. The optical touch panel system 4 comprises a reflective element 41, first and second lighting elements (421, 422), a first light projection apparatus 471, an image sensor 43 and a processor 44. The reflective element 41 is disposed on the first side 481 of the touch control area 48, and the first and second lighting elements (421, 422) are respectively disposed on the second side 482 and the third side 483 of the touch control area 48, wherein the second side 482 and the third side 483 are adjacent to each other, and the third side 483 is opposite the first side 481. The reflective element 41 may be, but not limited to, a plane mirror. The first and second lighting elements (421, 422) each may be a linear light source capable of emitting invisible light. The image sensor 43 preferably includes an image-sensing window and a filter. The filter allows light with specified wavelengths to enter the image sensor 43, such as infrared (IR) light.

The first light projection apparatus 471 includes a mirror 4711 and a light generator 4712. It can selectively designate either the mirror 4711 to reflect external light or the light generator 4712 to emit light. The first light projection apparatus 471 is disposed on the first side 481 together with the reflective element 41, and is at a location adjacent to the fourth side 484 of the touch control area 48. The first light projection apparatus 471 for example can be an assembly of a mirror, a light guide element, and a light source, and the assembly may switch between a light reflecting mode and a light emitting mode. However, the present invention is not limited to this example. For more reference, please refer to US 2011/0061950 also filed by the same applicant.

Figure 5A:
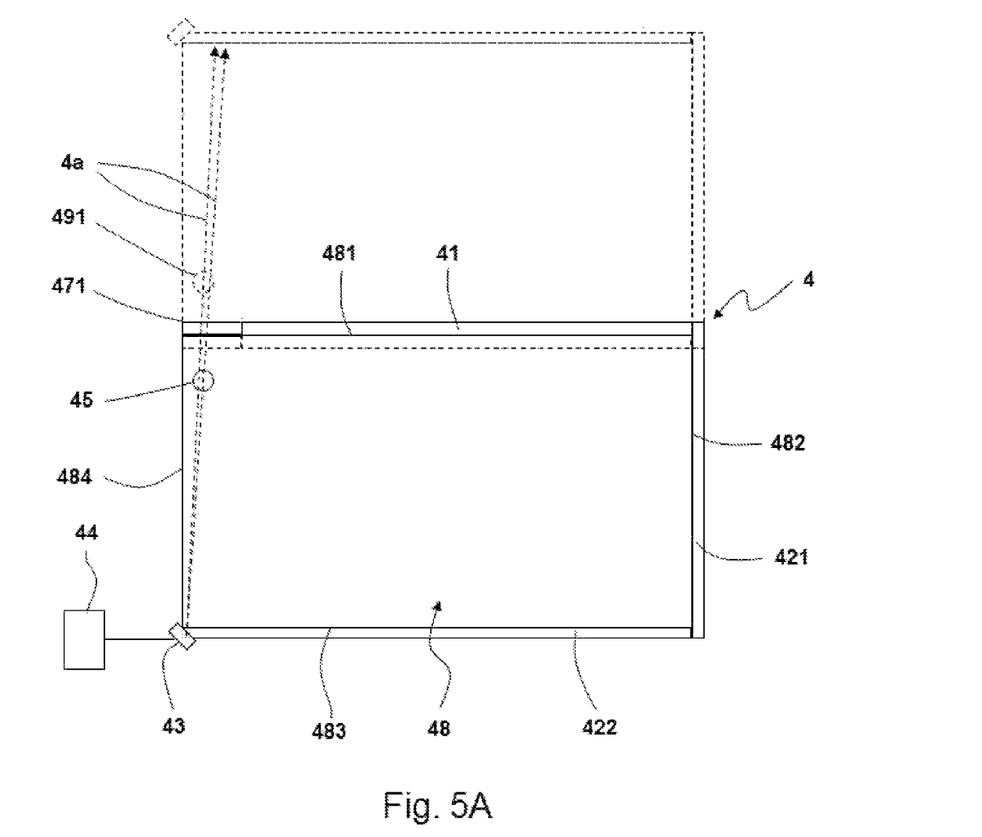
FIG. 5A shows that the optical touch panel system of FIG. 4 captures a first picture through the sensing paths passing the object.
Figure 6A:
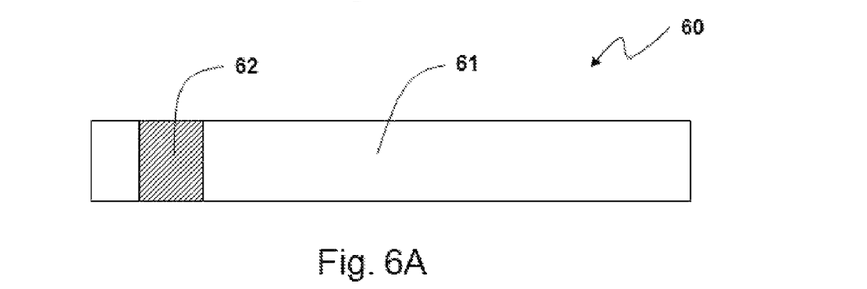
FIG. 6A shows a schematic diagram of the image-sensing window of the image sensor in FIG. 5A.

FIG. 5A shows that the optical touch panel system of FIG. 4 captures a first picture through the sensing paths passing the object. FIG. 6A shows a schematic diagram of the image-sensing window of the image sensor in FIG. 5A. When the object 45 is in or close to the neighborhood of the first light projection apparatus 471, the light generator 4712 of the first light projection apparatus 471 is inactivated, and the mirror 4711 can reflect the external light to form a first mirror image 491. That is, the first lighting element 421 and the second lighting element 422 can emit light to form a bright zone 61 with higher brightness in a first picture 60 captured by the image sensor 43. Because the object 45 shields a portion of light from the lighting elements, a narrow and dark object image is formed in the first picture 60. This object image is also referred to as the optical information of the object, or projected image of the object (projected object image). The first mirror image 491 also shields a portion of the light reflected by the mirror 4711 to form a dark image of the first mirror image 491 in the first picture 60. This dark image of the mirror image is also referred to as the optical information of the mirror image, or projected mirror image. When the two sensing paths 4a are too close, the projected image of the object 45 overlaps the projected image of the first mirror image 491 to form an overlapped imaging region 62 in the first picture 60, as shown in FIG. 6A.

Figure 5B:
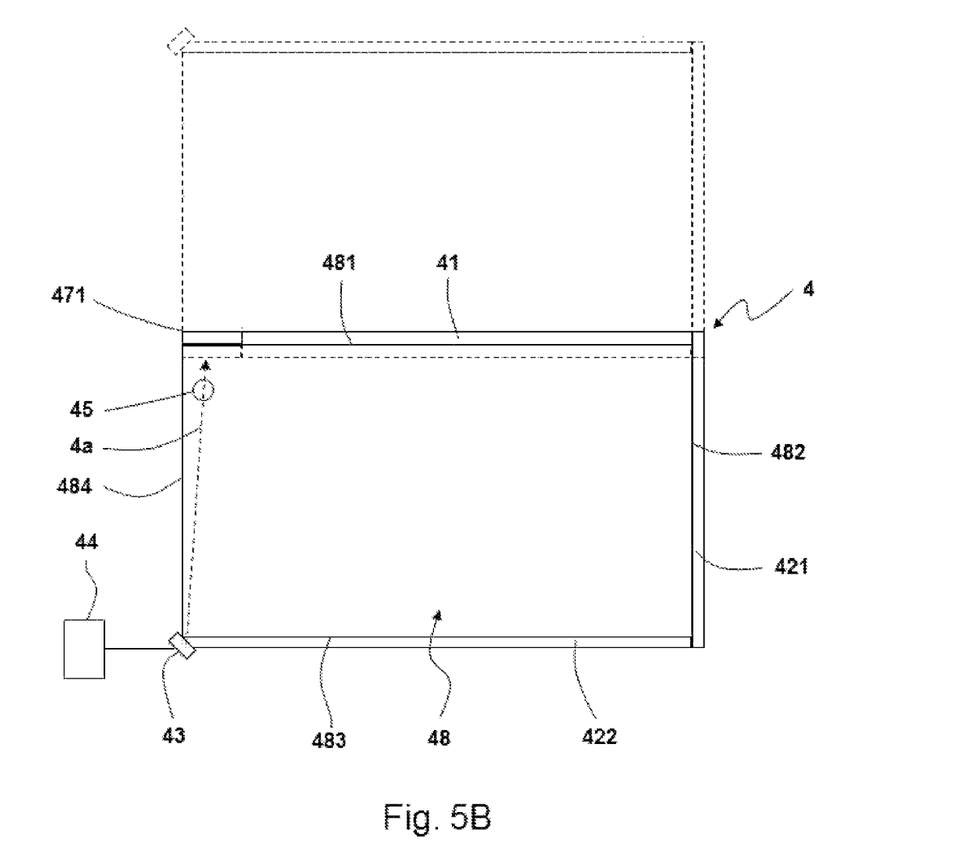
FIG. 5B shows that the optical touch panel system of FIG. 4 captures a second picture through another sensing path passing the object.
Figure 6B:
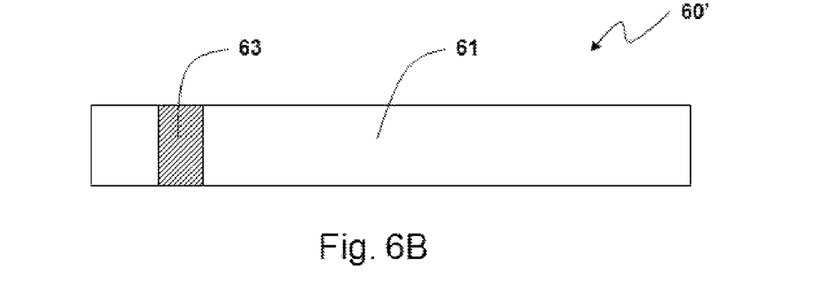
FIG. 6B shows a schematic diagram of the image-sensing window of the image sensor in FIG. 5B.

FIG. 5B shows that the optical touch panel system of FIG. 4 captures a second picture through another sensing path passing the object. FIG. 6B shows a schematic diagram of the image-sensing window of the image sensor in FIG. 5B. After the first picture 60 having the overlapped image 62 is obtained, the light generator 4712 of the first light projection apparatus 471 is activated. When the light generator 4712 emits light, the light goes through the mirror 4711, and is projected on the touch control area 48. The image sensor 43 then captures a second picture 60'. Unlike the first picture 60, the second picture 60' obtains an imaging region 63 of the sole image of the object 45, as shown in FIG. 6B.

The coordinate of the object can be calculated according to the geometrical information of the projected object image and the projected mirror image in the first and second pictures 60 and 60', for example by the left and right edges (borders) or gravity center of the projected object image 63 in the second picture 60' and the left and right edges of the overlapped image 62. The calculation method is explained in the following paragraphs with reference to FIG. 7.

Figure 7:
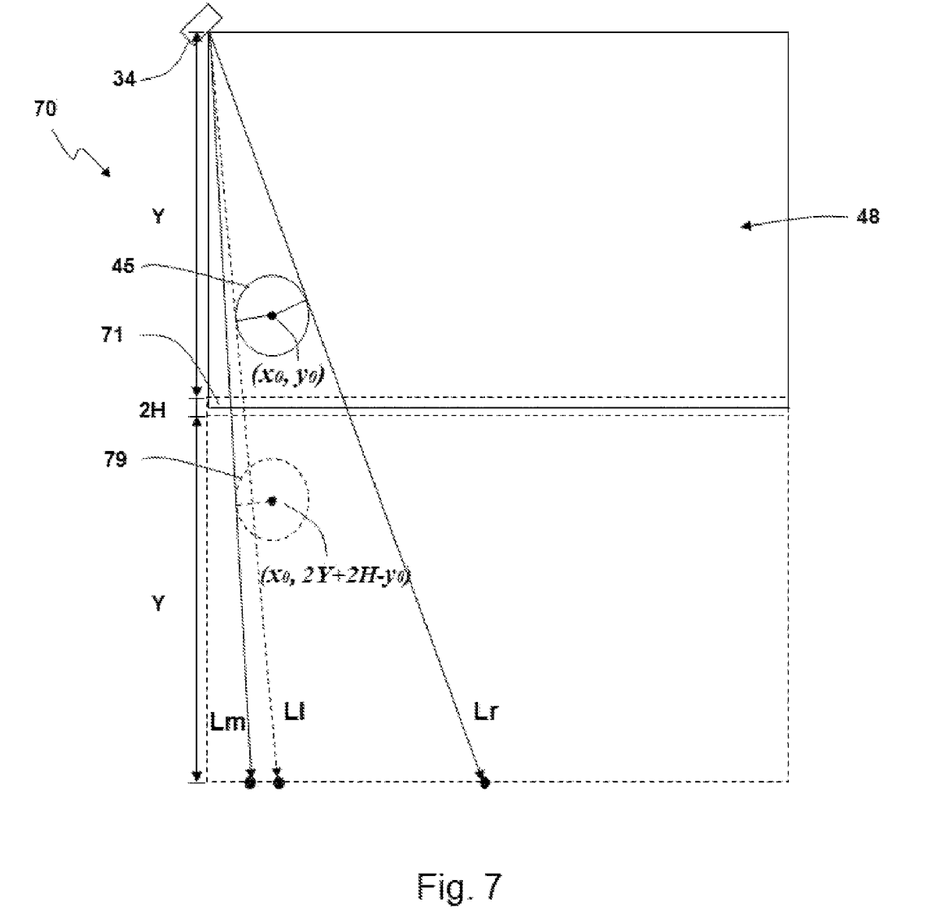
FIG. 7 shows an embodiment of the present invention illustrating the calculation based on the overlapped images in the optical touch panel system.

FIG. 7 shows an embodiment of the present invention illustrating the calculation of the overlapped image in the optical touch panel system. The optical touch panel system 70 includes an image sensor 34 and a mirror 71 opposite the image sensor 34. The height of the touch control area 48 is assumed to be Y, and the thickness of the mirror 71 is assumed to be H. The mirror 71 faces the touch control area 48, and it reflects the object 45 operating on the touch control area 48 to generate a mirror image 79. The processor analyzes the overlapped image to determine the left and right edges of it. According to the positions of the left and right edges, the sensing paths Lm and Lr can be determined by respectively connecting lines to the left and right edges from an origin. The sensing paths Lm and Lr can be obtained by the following formulas:

$$L_m: y = m_m x + b_m \quad (1)$$

$$L_r: y = m_r x + b_r \quad (2)$$

The origin for example can be set as the center or any position of the image sensor 34, or can be a reference position anywhere as long as its relationships with the image sensor 34 and the touch control area 48 are known. Moreover, the processor also checks the edges of projected object image in the merged image. According to the edges, the sensing paths Ll can be determined by connecting the left edge from the origin. The sensing path Ll can be obtained by the following formula:

$$L_l: y = m_l x + b_l \quad (3)$$

According to the parameters of the sensing paths Lr, Lm, and Ll, the height Y of the touch control area 48 and the thickness H of the mirror 71, the coordinate $(x_o, y_o)$ and the radius r of the object 45 can be obtained by the following formulas:

$$r = \frac{(2Y + 2H - b_m - b_l)(m_l - m_r) - (b_r - b_l)(m_m + m_l)}{(M_l + M_r)(m_m + m_l) - (M_m + M_l)(m_l - m_r)} \quad (4)$$

$$x_o = \frac{(2Y + 2H - b_m - b_l) + (M_m + M_l) \cdot r}{(m_m + m_l)} \quad (5)$$

$$y_o = -r \cdot M_l + b_l + m_l x_o \quad (6)$$

$$M_m = \sqrt{m_m^2 + 1} \quad (7)$$

$$M_l = \sqrt{m_l^2 + 1} \quad (8)$$

$$M_r = \sqrt{m_r^2 + 1} \quad (9)$$

Figure 8A:
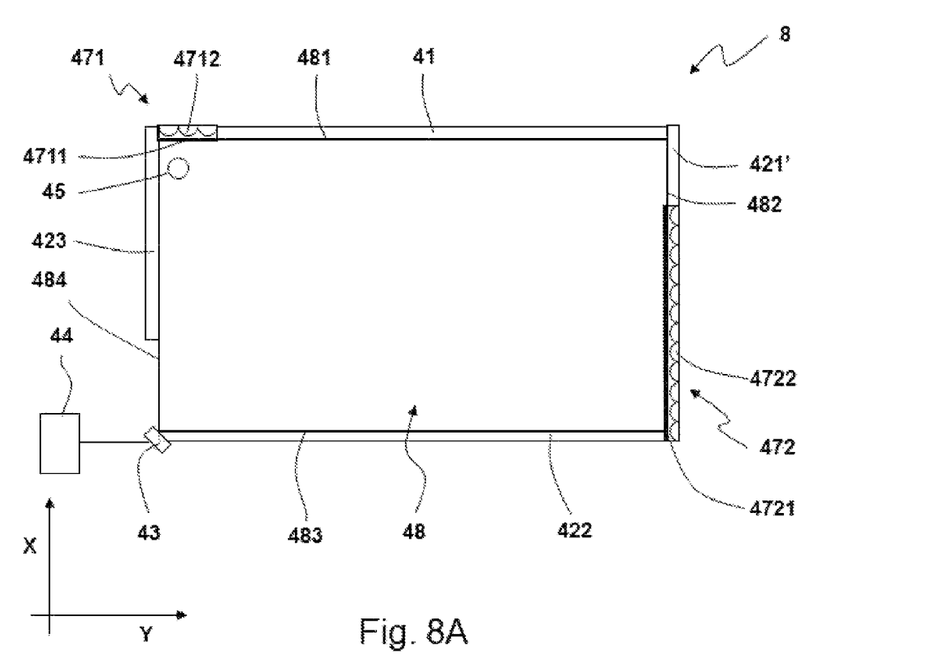
FIG. 8A shows a schematic diagram illustrating another embodiment of an optical touch panel system of the present invention.

FIG. 8A shows a schematic diagram illustrating another embodiment of an optical touch panel system of the present invention. As the object 45 touches the touch control area 48 of the optical touch panel system, the system can calculate the coordinate where the object 45 stays. The optical touch panel system 4 comprises a reflective element 41, first, second, and third lighting elements (421', 422, 423), a first light projection apparatus 471, a second light projection apparatus 472, an image sensor 43 and a processor 44. The reflective element 41 is disposed on the first side 481 of the touch control area 48, and the first, second, and third lighting elements (421', 422, 423) are respectively disposed on the second side 482, the third side 483, and the fourth side 484 of the touch control area 48, wherein the third lighting element 423 only covers a portion of the fourth side 484 in this embodiment. There is a distance between the third lighting element 423 on the fourth side 484 and the image sensor 43. This avoids errors in image recognition when the object 45 is close to the image sensor 43, which may otherwise occur because of the near distance reflection of the light emitted by the third lighting element 423.

The first light projection apparatus 471 includes a mirror 4711 and a light generator 4712. It can selectively designate either the mirror 4711 to reflect external light or the light generator 4712 to emit light. The second light projection apparatus 472 also includes a mirror 4721 and a light generator 4722. It also can selectively designate either the mirror 4721 to reflect external light or the light generator 4722 to emit light. The second light projection apparatus 472 is disposed on the second side 482, and is at a location adjacent to the first lighting element 421'. The first and second light projection apparatuses (471, 472) can respectively switch between a light reflecting mode and a light emitting mode such that the image sensor 43 can capture the projected object image, the projected mirror image, and the overlapped image. When the first light projection apparatus 471 is in the light reflecting mode and the second light projection apparatus 472 is in the light emitting mode, the image sensor 43 captures a first picture similar to the first picture 60 as shown in FIG. 6A. The length of the first light projection apparatus 471 is smaller than the length of the first side 481, and the length of the second light projection apparatus 472 is smaller than the length of the second side 482. In a preferred but not limiting embodiment, each of the light projection apparatuses 471 and 472 further includes a light guide unit, and the mirror 4711 or 4721 is disposed on a side of the light guide unit opposite the touch control area 48. When the light generator is activated, the light projection apparatus acts as a bright light source; when the light generator is inactivated, light entering the light projection apparatus is reflected by the mirror. An example is given in FIG. 8B.

Figure 8B:
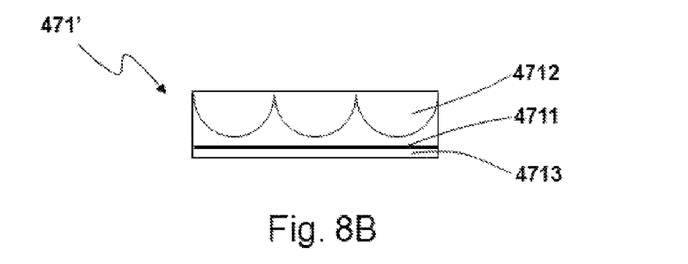
FIG. 8B shows a schematic diagram illustrating an embodiment of a first light projection apparatus of the present invention.

FIG. 8B shows a schematic diagram illustrating a preferred embodiment of a light projection apparatus of the present invention, which may be used as the first light projection apparatus 471 or the second first light projection apparatus 472 in FIG. 8A. The light projection apparatus 471' includes a mirror 4711 and a light generator 4712, and it further includes a light guide unit 4713. The mirror 4711 is disposed on a side of the light guide unit opposite the touch control area 48. When the light generator 4712 is activated, the first light projection apparatus 471' acts as a bright light source. When the light generator 4712 is inactivated, light entering it is reflected by the mirror 4711. Moreover, in one embodiment, the mirror 4711 may be a transflective lens. When the light generator 4712 is activated, the emitted light can pass the mirror 4711, and the first light projection apparatus 471' acts as a bright light source. When the light generator 4712 is inactivated, light entering the first light projection apparatus 471' is reflected by the mirror 4711.

Figure 9:
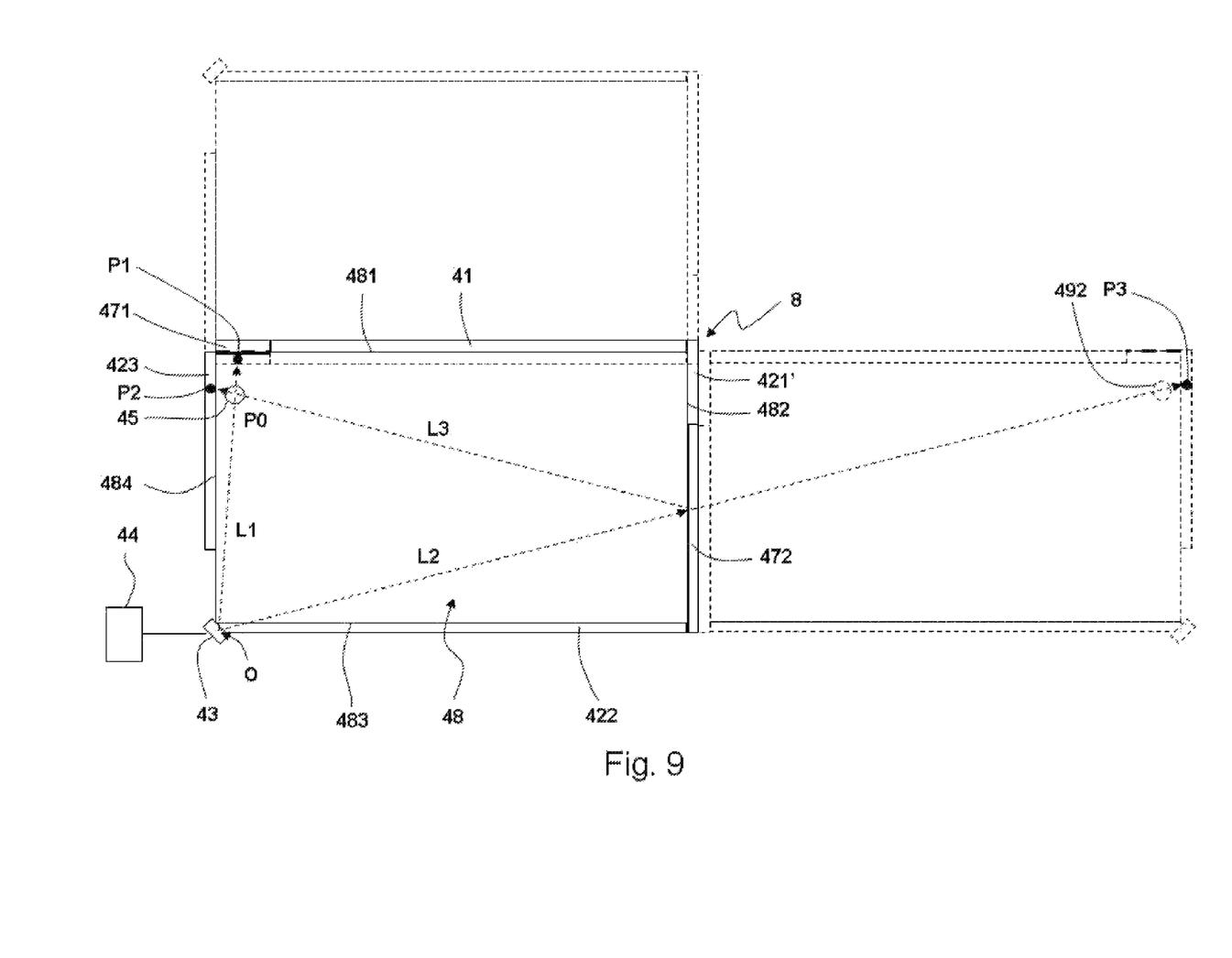
FIG. 9 shows that the optical touch panel system of FIG. 8A captures a second picture through the sensing path passing the object.
Figure 10:
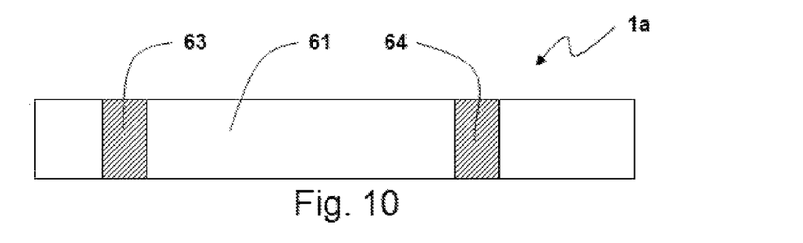
FIG. 10 shows a schematic diagram of the image-sensing window of the image sensor in FIG. 9.

When the first light projection apparatus 471 switches to the light emitting mode and the second light projection apparatus 472 switches to the light reflecting mode, the image sensor 43 captures the second picture, as shown in FIG. 9 and FIG. 10. FIG. 9 shows that the optical touch panel system of FIG. 8A captures a second picture through the sensing path passing the object 45. FIG. 10 shows a schematic diagram of the image-sensing window of the image sensor 43 in FIG. 9. A first lighting element 421', a second lighting element 422, a first light projection apparatus 471, and a third lighting element 423 emit light to form bright zones 61 with higher brightness in a second picture 1a captured by the image sensor 43. Because the object 45 shields a portion of light from the lighting elements, a narrow and dark imaging region 63, which is the projected object image, is formed in the second picture 1a. The second mirror image 492 also shields a portion of the light reflected by the mirror 4721, so it also forms a dark imaging region 64, which is the projected image of the second mirror image 492, as shown in FIG. 10.

The coordinate $(x_o, y_o)$ of the center P0 of the object 45 can be obtained according to the geometrical information of the dark points (shielded regions) P1-P3. The geometrical information for example can be the representative positions, the centers, or the gravities of the dark points shielded regions P1-P3. The calculation method is explained in the following. The coordinates of the P1, P2, and P3 are respectively represented by $(x_1, y_1)$, $(x_2, y_2)$, and $(x_3, y_3)$. The slopes of the sensing paths L1, L2, and L3 are respectively $m_1$, $m_2$, and $m_3$. The sensing paths L1 and L2 intersect at the origin O with the coordinate $(x_s, y_s)$. The sensing paths L1, L2, and L3 are represented by the following formulas:

$$L_1: y = m_1 x + b_1 \tag{10}$$

$$L_2: y = m_2 x + b_2 \tag{11}$$

$$L_3: y = m_3 x + b_3 \tag{12}$$

According to the known coordinates of P1, P2, P3, and O, the coordinate of the object 45 can be calculated by obtaining the unknown $m_1$-$m_3$ and $b_1$-$b_3$ through the following formulas:

$$m_1 = \frac{y_1 - y_s}{x_1 - x_s}; b_1 = y_1 - m_1 \times x_1 \tag{13}$$

$$m_2 = \frac{y_2 - y_s}{x_2 - x_s}; b_2 = y_2 - m_2 \times x_2 \tag{14}$$

$$m_3 = -m_2; b_3 = y_3 - m_3 \times x_3 \tag{15}$$

$$x_0 = \frac{b_3 - b_1}{m_1 - m_3} \tag{16}$$

$$y_0 = m_3 \times x_0 + b_3 \tag{17}$$

Figure 11:
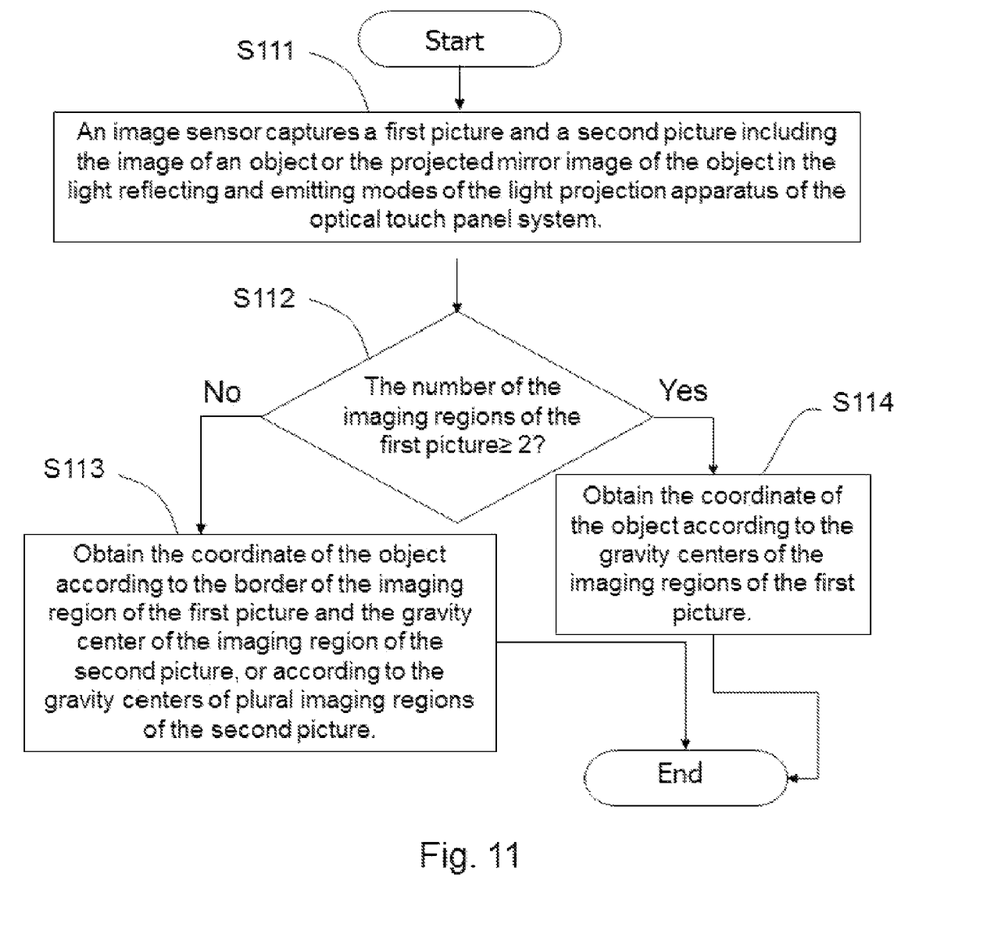
FIG. 11 shows a flow chart illustrating a positioning method of the optical touch panel system of the present invention.

FIG. 11 shows a flow chart illustrating an embodiment of a positioning method of the optical touch panel system of the present invention. As aforementioned, the optical touch panel system comprises a reflective element, at least one light projection apparatus, and at least two lighting elements. These elements and apparatus are located around a touch control area. In Step S111, the light projection apparatus of the optical touch panel system switches between a light reflecting mode and a light emitting mode, and the image sensor of the system respectively captures a first picture and a second picture in the two modes. The two pictures include a projected image of the object and/or a projected mirror image of the object in the touch control area. If the projected object image and the projected mirror image are nearby, they may form an overlapped imaging region in the first picture, as shown by the imaging region 63 of FIG. 6B. Thus, the number of the imaging region of the first picture is 1. Afterwards, Step S112 checks the number of the imaging regions of the first picture, to determine whether the number is 2 or larger than 2. If the projected object image and the projected mirror image overlap in the first picture, the number is 1, that is, smaller than 2. When the number of the imaging regions is smaller than 2, the coordinate of the object can be obtained according to the border (such as edges, which is one form of the geometrical information) of the imaging region of the first picture and the center or gravity center (another form of geometrical information) of the imaging region of the second picture, or according to the gravity centers (as shown in the two separate imaging regions of FIG. 10) of the plural imaging regions of the second picture, as shown in Step S113. If the number of the imaging regions is 2, the coordinate of the object can be obtained according to the geometrical information of the imaging regions of the first picture, as shown in Step S114.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the positions and the number of the lighting elements can be different from the foregoing embodiments. As another example, the area covered by the light projection apparatus is not limited to having a length as shown in the embodiments; it suffices as long as images with good optical information can be obtained. Thus, the present invention should cover all such and other modifications and variations, which should be interpreted to fall within the scope of the following claims and their equivalents.

What is claimed is:

1. An optical touch panel system for positioning an object in a touch control area, the system comprising:
   a reflective element disposed on a first side of the touch control area for reflecting light from the touch control area;
   two lighting elements respectively disposed on a second side and a third side of the touch control area, wherein the second side and the third side are adjacent to each other, and the third side is opposite the first side;

a first light projection apparatus including a planar mirror and a light generator, disposed on the first side and at a location adjacent to a fourth side of the touch control area, wherein the planar mirror and the reflective element are adjacent to each other and at a same side of the touch control area;

an image sensor capturing a first picture and a second picture respectively when the light generator is inactivated and activated, the light generator being inactivated and activated when the object is between the first light projection apparatus and the image sensor, wherein when the light generator is inactivated, the planar mirror reflects light external to the first light projection apparatus, and when the light generator is activated, light generated from the light generator goes through the planar mirror, the first light projection apparatus selectively operating to reflect light or to let light pass; and a processor calculating a coordinate of the object according to optical information of an object and a mirror image of the object in the first picture and the second picture, wherein the optical information of the object is a projected image of the object (projected object image) and the optical information of the mirror image is a projected image of the mirror image (projected mirror image).

2. The optical touch panel system of claim 1, wherein the processor calculates the coordinate of the object according to geometrical information of the optical information, and wherein the geometrical information includes centers, gravity centers, representative positions, or borders of the projected object image and the projected mirror image.

3. The optical touch panel system of claim 1, wherein the first light projection apparatus is adjacent to the fourth side, and the image sensor is disposed at the corner between the third side and the fourth side.

4. The optical touch panel system of claim 1, wherein the first picture includes an overlapped imaging region in which the projected object image overlaps the projected mirror image, or two separate imaging regions one including the projected object image and the other including the projected mirror image; the second picture includes an imaging region of the projected object image.

5. The optical touch panel system of claim 4, wherein the processor obtains the coordinate of the object according to the border of the overlapped imaging region of the first picture and the gravity center of the imaging region of the second picture.

6. The optical touch panel system of claim 4, wherein the processor obtains the coordinate of the object according to the gravity centers of the two imaging regions of the first picture.

7. The optical touch panel system of claim 1, further comprising a second light projection apparatus disposed on the second side and at a location adjacent to the third side, wherein the second light projection apparatus includes a mirror and a light generator.

8. The optical touch panel system of claim 7, further comprising a lighting element disposed on the fourth side.

9. The optical touch panel system of claim 7, wherein the first picture is captured by the image sensor when the first light projection apparatus inactivates its light generator and the second light projection apparatus activates its light generator, the first picture including one overlapped imaging region in which the projected object image overlaps the projected mirror image, or two separate imaging regions one including the projected object image and the other including the projected mirror image; the second picture is captured by the image sensor when the first light projection apparatus activates its light generator and the second light projection apparatus inactivates its light generator, wherein the second picture includes two separate imaging regions one including the projected object image and the other including the projected mirror image.

10. The optical touch panel system of claim 7, wherein the length of the first light projection apparatus is smaller than the length of the first side, and the length of the second light projection apparatus is smaller than the length of the second side.

11. The optical touch panel system of claim 9, wherein the processor obtains the coordinate of the object according to the gravity centers of the two imaging regions of the second picture when the first picture includes only one imaging region.

12. The optical touch panel system of claim 9, wherein the processor obtains the coordinate of the object according to the gravity centers of the two imaging regions of the first picture.

13. The optical touch panel system of claim 1, wherein the first light projection apparatus includes a light guide unit, and the planar mirror of the first light projection apparatus is disposed on a side of the light guide unit opposite the touch control area; when the light generator is activated, the first light projection apparatus serves as a bright light source; when the light generator is inactivated, light entering the first projection apparatus is reflected by the planar mirror.

14. The optical touch panel system of claim 1, wherein the first projection apparatus includes a light guide unit, and the planar mirror of the first projection apparatus is disposed on a side of the light guide unit opposite the touch control area; the planar mirror being a transflective lens, and when the light generator is activated, light generated by the light generator passes through the planar mirror so that the first light projection apparatus serves as a bright light source; when the light generator is inactivated, light entering the first projection apparatus is reflected by the planar mirror.

15. A method of positioning an object in an optical touch panel system, the optical touch panel system including an image sensor for capturing a projected image of an object (projected object image) and a projected image of a mirror image of the object (projected mirror image) in a touch control area, the method comprising:

providing a first light projection apparatus capable of switching between a light emitting mode and a light reflecting mode, the first light projection apparatus switching between the light reflecting mode and the light emitting mode when the object is between the first light projection apparatus and the image sensor, the first light projection apparatus including a planar mirror and a light generator, wherein when the light generator is in the light reflecting mode, the planar mirror reflects light external to the first light projection apparatus, and when the light generator is in the light emitting mode, light generated from the light generator goes through the planar mirror, the first light projection apparatus selectively operating to reflect light or to let light pass;

respectively capturing a first picture and a second picture by the image sensor when the first light projection apparatus is in the light emitting mode and the light reflecting mode, wherein the first picture and the second picture include imaging regions of the projected object image or the projected mirror image;

checking a number of the imaging region or image regions of the first picture;

if the number of the imaging region of the first picture is 1, obtaining the coordinate of the object according to geometrical information of imaging regions in the first picture and the second picture or according to geometrical information of imaging regions in the second picture; and if the number of the imaging regions of the first picture is 2, obtaining the coordinate of the object according to geometrical information of imaging regions in the first picture;

wherein the planar mirror and a reflective element are disposed at a same side of the touch control area, and have same normal directions, the reflective element reflecting light from the touch control area.

16. The method of positioning an object in an optical touch panel system of claim 15, wherein the geometrical information includes centers, gravity centers, representative positions, or borders of the projected object image and the projected mirror image.

17. The method of positioning an object in an optical touch panel system of claim 15, wherein the imaging region of the first picture has brightness lower than brightness of a rest region of the first picture, and the imaging region of the second picture has brightness lower than brightness of a rest region of the second picture.

18. The method of positioning an object in an optical touch panel system of claim 15, wherein the first picture is captured by the image sensor when the first light projection apparatus inactivates the light generator, the first picture including one overlapped imaging region in which the projected object image overlaps the projected mirror image, or two separate imaging regions one including the projected object image and the other including the projected mirror image; and wherein the second picture is captured by the image sensor when the first light projection apparatus activates the light generator, the second picture including an imaging region of the projected object image.

19. The method of positioning an object in an optical touch panel system of claim 18, wherein the coordinate of the object is obtained according to the border of the overlapped imaging region of the first picture and the gravity center of the imaging region of the second picture.

20. The method of positioning an object in an optical touch panel system of claim 18, wherein the coordinate of the object is obtained according to the gravity centers of the two imaging regions of the first picture.

21. The method of positioning an object in an optical touch panel system of claim 15, further comprising a step of providing a second light projection apparatus capable of switching between a light emitting mode and a light reflecting mode.

22. The method of positioning an object in an optical touch panel system of claim 21, wherein the first picture is captured by the image sensor when the first light projection apparatus inactivates its light generator and the second light projection apparatus activates its light generator, the first picture including one overlapped imaging region in which the projected object image overlaps the projected mirror image, or two separate imaging regions one including the projected object image and the other including the projected mirror image; and wherein the second picture is captured by the image sensor when the first light projection apparatus activates its light generator and the second light projection apparatus inactivates its light generator, the second picture including two separate imaging regions of the projected object image and the projected mirror image.

23. The method of positioning an object in an optical touch panel system of claim 22, wherein the coordinate of the object is obtained according to the gravity centers of the two imaging regions of the second picture when the first picture includes only one imaging region.

24. The method of positioning an object in an optical touch panel system of claim 22, wherein the coordinate of the object is obtained according to the gravity centers of the two imaging regions of the first picture.

* * * * *